(12) United States Patent
Sommermann et al.

(10) Patent No.: US 7,193,085 B2
(45) Date of Patent: Mar. 20, 2007

(54) ACID RED 82 IN MIXTURES

(75) Inventors: Thomas Sommermann, Bergisch Gladbach (DE); Peter Wild, Odenthal (DE)

(73) Assignee: Lanxess Deutschland GmbH, Leverkusen (DE)

( * ) Notice: Subject to any disclaimer, the term of this patent is extended or adjusted under 35 U.S.C. 154(b) by 0 days.

(21) Appl. No.: 10/529,185

(22) PCT Filed: Sep. 13, 2003

(86) PCT No.: PCT/EP03/10210

§ 371 (c)(1),
(2), (4) Date: Dec. 20, 2005

(87) PCT Pub. No.: WO2004/031301

PCT Pub. Date: Apr. 15, 2004

(65) Prior Publication Data

US 2006/0144289 A1    Jul. 6, 2006

(30) Foreign Application Priority Data

Sep. 27, 2002   (DE) ................. 102 45 080

(51) Int. Cl.
  *C07D 221/18*  (2006.01)
  *C09D 11/02*  (2006.01)
  *C09B 67/22*  (2006.01)

(52) U.S. Cl. .............. 546/76; 523/160; 106/22 R

(58) Field of Classification Search ............ 546/76; 106/31.47, 31.43, 22 R; 523/160
See application file for complete search history.

(56) References Cited

U.S. PATENT DOCUMENTS

| 4,106,027 | A | 8/1978 | Hoffmann et al. ........... 346/1 |
| 4,446,470 | A | 5/1984 | Sugiyama et al. ....... 346/140 R |
| 6,211,265 | B1 | 4/2001 | Ohta et al. .................. 523/160 |
| 6,482,256 | B1 * | 11/2002 | Kanaya et al. ........... 106/31.51 |
| 6,645,283 | B1 | 11/2003 | Matsumoto et al. ..... 106/31.47 |

FOREIGN PATENT DOCUMENTS

| EP | 1 283 248 | 2/2003 |
| JP | 57195775 | 12/1982 |
| JP | 02016171 | 1/1990 |

\* cited by examiner

*Primary Examiner*—Charanjit S. Aulakh
(74) *Attorney, Agent, or Firm*—Michael A. Miller

(57) ABSTRACT

The invention relates to mixtures containing the dye C.I. Acid Red 82 (formula IIb) and C.I. Acid Red 80 (formula IIc)

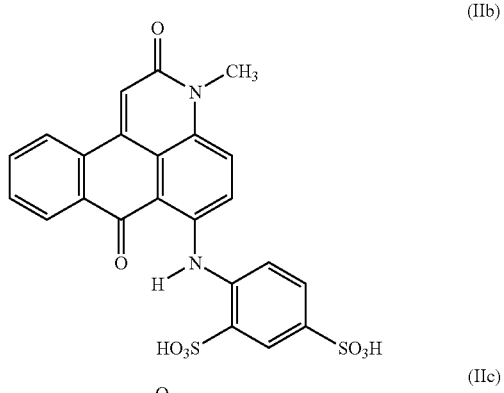

(IIb)

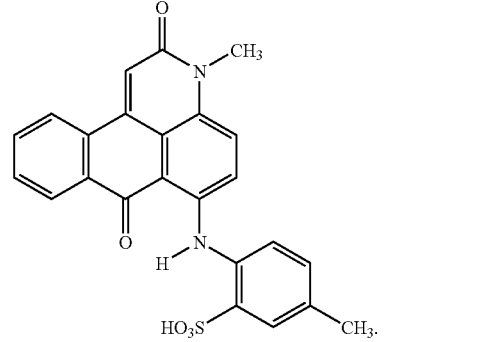

(IIc)

12 Claims, No Drawings

ACID RED 82 IN MIXTURES

The present invention concerns mixtures of Acid Red 82 and Acid Red 80, processes for their production and their use in a printing ink suitable for the ink jet process. Magenta printing inks of this kind possess a surprisingly high long term stability whereby it is possible to produce prints of very high light and ozone fastness and of suitable hue.

In ink jet printing, droplets of an ink are jetted from small nozzles onto a substrate (paper, textiles, plastic, metal). Electronic control is used to group the droplets together into script characters or graphics. The fine ink droplets can be produced by different processes; the preferred processes are the well-known continuous processes and drop-on-demand processes (thermal ink jet, bubble jet, piezo ink jet).

EP-A-1 123 932 discloses the use of anthrapyridone derivatives as magenta dyes in the ink jet process which are notable for particularly high light and ozone fastness. Especially dyes of the type of the general formula (I)

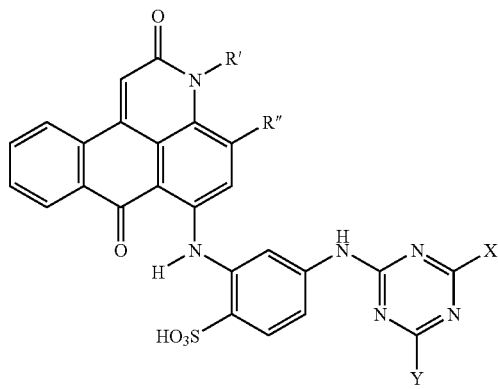

(I)

where
R' is H or alkyl, and
R" is H, alkyl, OPh, $SO_3H$ or COOH
(Ph=phenyl)
are described therein as suitable.

The substituents X and Y used therein are mainly substituents which confer an enhanced solubility on the dye in aqueous solution. However, the advantage of enhanced solubility comes at the expense of a distinctly reduced color strength. In addition, the dyes are relatively costly and inconvenient to synthesize.

A similar light and ozone fastness to dyes of type I but combined with a distinctly higher color strength is in fact already on offer from structurally simpler anthrapyridones such as, for example C. I. Acid Red 82 (formula IIb),

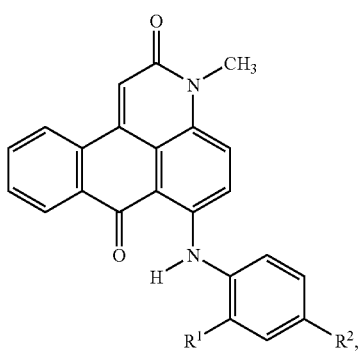

(II)

where
a) $R^1$=H; $R^2$=$SO_3H$: Acid Red 81
b) $R^1$=$SO_3H$; $R^2$=$SO_3H$: Acid Red 82
c) $R^1$=$SO_3H$; $R^2$=$CH_3$: Acid Red 80.

The dyes have already been disclosed individually for use in the ink jet process, for example in DE-A-2 543 092, DE-A-3 220 334 and in EP-A-1 048 705.

However, practical use in the ink jet process of the simple-to-synthesize dye C. I. Acid Red 82 has hitherto not been achieved, since it proved impossible to achieve adequate long term stability in the ink formulations used for ink jet printing. In addition, the hue of an ink-jettable aqueous ink solution of Acid Red 82 has a more reddish tinge than the dye solutions customarily used as the magenta component in an ink set.

The present invention therefore had for its object to provide a way of using the C. I. Acid Red 82 dye in customary ink jet inks which offers a very good long term stability and additionally, if appropriate, a small bathochromic shift in hue coupled with unchanged light and ozone fastness for the print. In addition, industrial implementation of the way of using the Acid Red 82 dye in jettable inks shall not exceed the cost of synthesizing Acid Red 82.

We have found that, surprisingly, a mixture of Acid Red 82 with the anthrapyridone dye C. I. Acid Red 80 (IIc) has distinctly enhanced long term stability in ink formulations even though the solubility of Acid Red 80 is less than that of Acid Red 82.

A corresponding mixture of Acid Red 82 and Acid Red 81, by contrast, has distinctly worse long term stability.

The invention accordingly provides a mixture comprising the dyes C.I. Acid Red 82 (formula IIb) and C.I. Acid Red 80 (formula IIc).

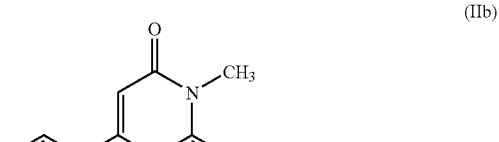

(IIb)

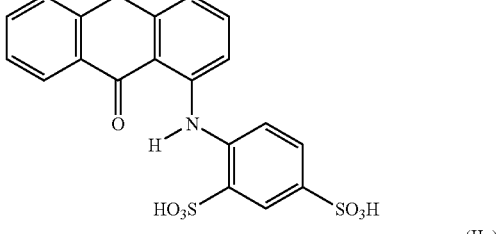

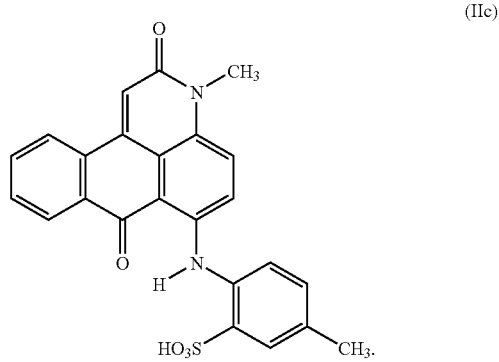

(IIc)

Preferred mixtures are characterized in that the weight ratio of (IIb) to (IIc) is in the range from 99:1 to 1:99, preferably in the range from 98:2 to 50:50, especially in the range from 96:4 to 70:30, and most preferably in the range from 95:5 to 85:15.

The dyes of the formulae (IIb) and (IIc) are preferably present in the form of their salts, the cations used being sodium, lithium, ammonium, tetraalkylammonium, trialkanolammonium, alkyldialkanolammonium.

The mixtures of the invention can be present in solid form, for example as a powder or granules, and also in liquid form, for example as a suspension such as pastes or aqueous solutions.

The mixtures of the invention are more preferably present as aqueous solutions, which likewise form part of the subject matter of the invention.

The aqueous solutions of the invention, as well as the dyes of the formulae (IIb) and (IIc), can of course further comprise further dyes, especially for shading.

They are preferably characterized in that 90% to 100% by weight especially 95% to 100% and more preferably 98% to 100% by weight of the dye quantity consists of dyes of the formulae (IIb) and (IIc).

The amount of dye of the formulae (IIb) and (IIc) in the aqueous solution of the invention is preferably in the range from 0.01% to 25.0% by weight, especially in the range from 0.01% to 15.0% by weight, more preferably in the range from 0.05% to 10.0% by weight and even more preferably in the range from 0.1% to 5.0% by weight. It is likewise preferable for an aqueous solution according to the invention to comprise 25% by weight or more and especially 85% to 99.99% by weight of water and if appropriate solvent, preferably 0% to 50% by weight and especially 0% to 15% by weight, and also if appropriate further customary constituents.

In a preferred embodiment aqueous solutions according to the invention comprise 5% to 25% by weight of dye, with 90–100% by weight of the dye consisting of dyes of the formulae (IIb) and (IIc), the balance being water. These aqueous solutions of the invention are used especially as concentrates for producing inks.

In a likewise preferred embodiment the aqueous solution of the invention comprises 0.01% to 15.0% by weight of dye of the formulae (IIb) and (IIc), preferably 0.05% to 10.0% by weight and more preferably 0.1% to 5.0% by weight. It is likewise preferable for them to comprise 0% to 50% by weight and preferably 15% to 40% by weight of organic solvent. Aqueous solutions of this kind are preferably used as a recording fluid, i.e., as an ink.

Preferred organic solvents are organic solvents which are miscible with water, especially alcohols and their ethers or esters, carboxamides, ureas, sulfoxides and sulfones, especially those having molecular weights<200 g/mol. Particularly suitable solvents are for example: methanol, ethanol, propanol; ethylene glycol, propylene glycol, diethylene glycol, thiodiethylene glycol and dipropylene glycol; butanediol; -hydroxypropionitrile, pentamethylene glycol, ethylene glycol monoethyl ether, ethylene glycol monopropyl ether, ethylene glycol monobutyl ether, ethylene diglycol monoethyl ether, triethylene glycol monobutyl ether, butylpolyglycol, formamide, triethylene glycol, 1,5-pentanediol, 1,3,6-hexanetriol, 2-hydroxyethyl acetate, 2(2'-hydroxyethyl acetate, glycerol, glycol acetate, 1,2-dihydroxypropane, 1-methoxy-2-propanol, 2-methoxy-1-propanol, N,N-dimethylformamide, pyrrolidone, ε-caprolactam, N-methylcaprolactam, butyrolactone, urea, tetramethylurea, 1,3-dimethyl-2-imidazolidinone, N,N'-dimethylolpropyleneurea, dimethyl sulfoxide, dimethyl sulfone, sulfolane, isopropanol, polyethylene glycol and also mixtures thereof.

It is further preferable to have the aqueous solutions of the invention contain very little by way of foreign salts. Foreign salts in this connection are generally to be understood as meaning those salts which can arise in the course of the synthesis of the dyes of the formulae (IIb) and (IIc), examples of such salts being sodium chloride, potassium chloride, sodium sulfate, potassium sulfate and also mixtures thereof.

The foreign salt content is preferably <1% by weight based on the solution, especially <0.5% by weight.

Such a low foreign salt content is obtainable for example through reverse osmosis or ultrafiltration using appropriate membranes.

The mixture of the invention can be produced for example in a process wherein a) the dyes of the formulae (IIb) and (IIc) are mixed with each other or b) a compound of the formula (III) is reacted with a mixture of anilines of the formulae (IVb) and (IVc) and the resulting mixture of compounds of the formulae (Vb) and (Vc) is sulfated, or c) the compounds of the formulae (Vb) and (Vc) are separately prepared and conjointly sulfated to form the mixture of the invention.

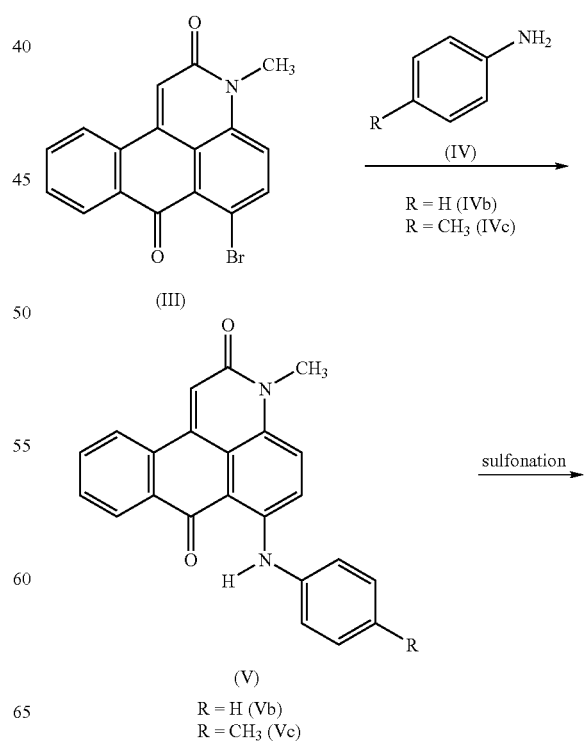

-continued

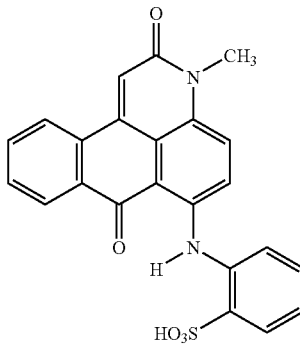

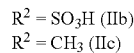

In production variant b), 6-bromo-3-methyl-3H-dibenz[f,ij]isoquinoline-2,7-dione of the formula (III) is preferably reacted in a mixture of aniline and 4-methylaniline (IVb+IVc) in a ratio reckoned to give the desired ratio for the end products (IIb and IIc), especially in a ratio of 95.3:4.7, in the presence of sodium carbonate, especially at a temperature of 170–180° C., and the resulting mixed dyebase (Vb and Vc) is subsequently sulfated by means of a sulfonating agent, for example sulfuric acid having a 20% fraction of sulfur trioxide (oleum 20%), to form the product mix of A.R. 82 (IIb) and A.R. 80 (IIc). The sulfonation is preferably carried out at 20–40° C.

The mixture can subsequently be desalted by reverse osmosis and mixed with suitable solvent and auxiliary chemicals to form an ink for use in the ink jet process. This also applies to the mixtures produced according to variant c).

In production variant c), 6-bromo-3-methyl-3H-dibenz[f,ij]isoquinoline-2,7-dione of the formula (III) is preferably reacted with aniline and 4-methylaniline (IVb and IVc respectively) to prepare the color bases (Va and Vb) separately, which are then mixed in a ratio reckoned to produce the desired ratio for the end products and further sulfated as described above.

The A. R. 82 (IIb) and A. R. 80 (IIc) products can be separately prepared and mixed in a ratio reckoned for the desired ratio of the end products, as per alternative a). Following possible desalting, the solutions can then be further mixed with suitable solvent and auxiliary chemicals to form an ink for use in the ink jet process. Alternative b) is preferable.

Useful auxiliaries include for example solubilizers, dispersants, wetting agents, biocides or buffering systems. The fraction of these components is generally 0–10% by weight and preferably 0–5% by weight, based on the weight of the preparation.

The use of the present invention's dye mixture in the form of aqueous solutions as a recording fluid for ink jet recording systems provides the following advantages compared with using C. I. Acid Red 82 as sole dye for the same purpose:
  Good long term stability is achieved for the ink formulation with regard to change in physical properties and the formation of deposits;
  The hue of the ink formulation printed in the ink jet process is bathochromically shifted.

The following advantages of using the individual dye remain unchanged:
  The prints obtained in the ink jet process have very high light and ozone fastness;
  Color strength is higher compared with the above mentioned, more complicatedly constructed anthrapyridone dyes of the formula I;
  The cost and inconvenience of producing the dye mixture is comparatively low in that it is no more than that required to produce the individual dye.

The examples which follow illustrate the invention. Parts are by weight.

EXAMPLE 1 (ACID RED 82)

C. I. Acid Red 82 was prepared by heating 150 parts of aniline, 12 parts of sodium carbonate and 60 parts of 6-bromo-3-methyl-3H-dibenz[f,ij]isoquinoline-2,7-dione (III) to 180° C. for 4 h,

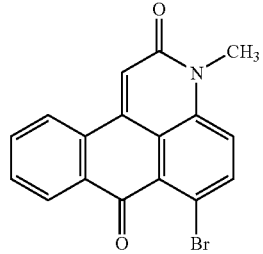

liberated water being removed from the reaction by means of a water separator. Cooling to 80° C. was followed by addition of 120 parts of methanol, cooling to room temperature, filtration with suction and washing with 40 parts of methanol. The residue was slurried up in 150 parts of water, adjusted to pH 1 with concentrated hydrochloric acid and heat treated at 80° C. for 1 h. This was followed by filtration with suction, washing with water and drying.

The 65 parts of paste obtained were added a little at a time to 210 parts of oleum 20% such that the temperature did not exceed 40° C., before stirring at 40° C. for 16 h. The reaction mixture was then poured onto 800 parts of ice, filtered off with suction and washed with dilute hydrochloric acid. The moist presscake was dissolved in 300 ml of distilled water, adjusted to pH 7.5 with aqueous sodium hydroxide solution and desalted by reverse osmosis to a salt content of less than 0.1% by weight, based on the solution. A final volume of 890 mL was then set with distilled water. The aqueous dye solution thus obtained contains 10% by weight of Acid Red 82 reckoned as pure dye.

EXAMPLE 2 (ACID RED 80)

C. I. Acid Red 80 was prepared by following Example 1 but using 170 parts of 4-methylaniline instead of 150 parts of aniline. Following desalting by reverse osmosis, a final volume of 760 mL was set with distilled water. The aqueous dye solution thus obtained contains 10% of Acid Red 80, reckoned as pure dye.

EXAMPLE 3

Example 1 was repeated except that the 150 parts of aniline were replaced by a mixture of 143 parts of aniline and 7 parts of 4-methylaniline to produce a mixture according to the invention, the Acid Red 82 and Acid Red 80 components being present therein in a ratio of 90:10, based on % by weight of pure dye. After desalting by reverse osmosis, a final volume of 870 mL was set with distilled water. The aqueous dye solution thus obtained contains 10% of pure dye as a mixture of Acid Red 82 and Acid Red 80.

EXAMPLE 4 (COMPARATIVE)

The following components were mixed with each other and filtered through a cellulose nitrate filter of 0.2 μm pore size to produce an ink suitable for the ink jet process. The ink formulation is in its composition analogous to a conventional printing ink as disclosed for example in EP-A 1048705.

| | |
|---|---|
| C.I. Acid Red 82 dye solution of Example 1 | 30 parts |
| Distilled water | 35 parts |
| Glycerol | 5 parts |
| Diethylene glycol | 15 parts |
| Diethylene glycol monobutyl ether | 5 parts |
| 1,3-Dimethylimidazolidin-2-one | 5 parts |
| N,N-Dimethylurea | 5 parts |

Precipitations were observed in this ink formulation after 8 weeks of storage at room temperature and independently after 20 days of storage at 50° C.

EXAMPLE 5 (COMPARATIVE)

Example 4 was repeated except that a C. I. Acid Red 80 dye solution prepared according to Example 2 was used. Precipitations were observed in this ink formulation after 6 weeks of storage at room temperature and independently after 20 days of storage at 50° C.

EXAMPLE 6 (COMPARATIVE)

Example 4 was repeated except that a 10% dye solution of C.I. Acid Red 82 and Acid Red 81 in a ratio of 90:10, produced by mixing the individual dyes, was used. Precipitations were observed in this ink formulation after 2 weeks of storage at room temperature and independently after 5 days of storage at 50° C.

EXAMPLE 7

Example 4 was repeated except that the inventive dye solution prepared according to Example 3 was used. No precipitations whatsoever were observed even after a storage time of 6 months at room temperature or at 50° C.

The same result was incidentally observed when the two dyes were not conjointly synthesized, but were mixed after separate syntheses and the mixtures were used.

What is claimed is:

1. A mixture comprising dyes according to formula IIb and formula IIc:

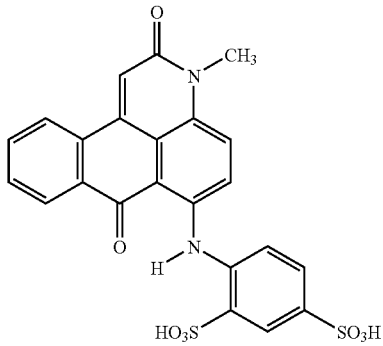

(IIb)

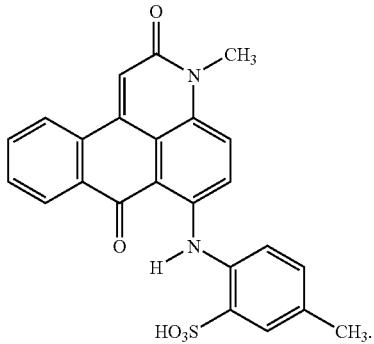

(IIc)

2. The mixture according to claim 1, wherein the weight ratio of (IIb) to (IIc) is in the range from 99:1 to 1:99.

3. The mixture according to claim 1 wherein the dyes are present in the form of their salts.

4. The mixture according to claim 1 wherein the mixture is present in an aqueous solution.

5. The mixture according to claim 4 wherein the dyes according to formula (IIb) and formula (IIc) comprise 90% to 100% by weight of the total amount of dye present in the mixture.

6. The mixture according to claim 4 wherein the amount of dye present in the aqueous solution ranges from 0.01% to 15.0% by weight, based on the total weight of the aqueous solution.

7. The mixture according to claim 4 further comprising one or more organic solvents in an amount ranging from 0% to 50% by weight.

8. A process for producing mixtures according to claim 1, comprising:
   a) mixing together dyes according to the formula (IIb) with dyes according to the formula (IIc).

9. A recording fluid for use with ink jet printing comprising the mixture according to claim 4.

10. The mixture of claim 3 wherein the cations forming the salts of the dyes are selected sodium, lithium, ammonium, tetraalkylammonium, trialkanolammonium, and/or alkyldialkanolammoniun.

11. The process of claim 8 wherein the mixing comprises:
   a. reacting a compound of formula (III):

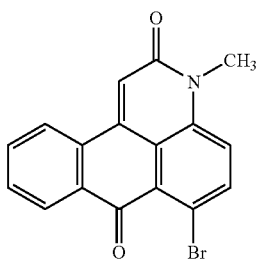

(III)

with one or more anilines of formula (IVb) and (IVc):

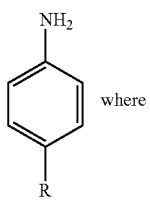

where

R = H (IVb)
R = CH₃ (IVc)

to produce a mixture of compounds of formula (Vb) and (Vc):

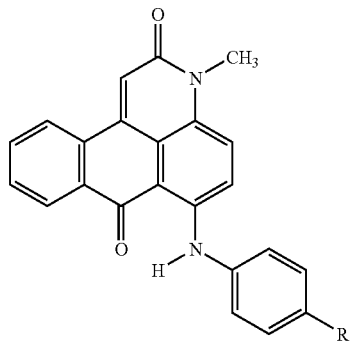

R = H (Vb)
R = CH₃ (Vc)

and b. sulfonating the compounds according to formula (Vb) and (Vc) thereby producing a mixture of compounds according to formula (IIb) and formula (IIc).

12. The process of claim 8 wherein the mixing comprises:

a. separately preparing compounds according to formula (Vb) and formula (Vc):

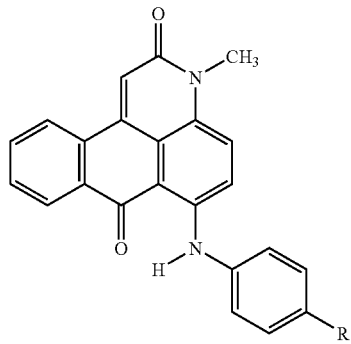

R = H (Vb)
R = CH₃ (Vc)

b. mixing compounds according to formula (Vb) with compounds of formula (Vc) together, and c. sulfonating the mixture of compounds according to formula (Vb) and (Vc) thereby producing a mixture of compounds according to formula (IIb) and (IIc).

* * * * *